United States Patent

Bach et al.

[11] Patent Number: 5,371,266
[45] Date of Patent: Dec. 6, 1994

[54] BICHROMOPHORIC CYANO-CONTAINING METHINE DYES AND TRANSFER THEREOF

[75] Inventors: Volker Bach, Neustadt; Karl-Heinz Etzbach, Frankenthal; Ruediger Sens, Mannheim, all of Germany

[73] Assignee: BASF Aktiengesellschaft, Ludwigshafen, Germany

[21] Appl. No.: 199,355

[22] Filed: Feb. 18, 1994

Related U.S. Application Data

[63] Continuation of Ser. No. 851,779, Mar. 16, 1992, abandoned, which is a continuation of Ser. No. 650,220, Feb. 4, 1991, abandoned.

[30] Foreign Application Priority Data

Feb. 15, 1990 [DE] Germany ............... 4004613

[51] Int. Cl.$^5$ ............... C07C 255/34; C07C 255/37; C07C 255/38
[52] U.S. Cl. ............... 558/403; 544/111; 544/128; 546/165; 546/166; 546/171
[58] Field of Search ............... 558/403

[56] References Cited

U.S. PATENT DOCUMENTS

| | | | |
|---|---|---|---|
| 2,889,335 | 6/1959 | Heckert | 260/319 |
| 3,553,245 | 1/1971 | Weaver et al. | 558/403 |
| 3,879,434 | 4/1975 | Weaver | 558/403 |
| 3,979,429 | 9/1976 | Zirngibl | 260/463 |
| 4,167,490 | 9/1979 | Looney | 558/403 X |
| 4,331,584 | 5/1982 | Nishikuri et al. | 524/206 |
| 4,829,047 | 5/1989 | Niwa et al. | 428/195 X |
| 4,914,190 | 4/1990 | Liechti et al. | 558/403 X |
| 4,992,558 | 2/1991 | Liechti | 558/403 X |

FOREIGN PATENT DOCUMENTS

| | | |
|---|---|---|
| 0111004 | 6/1984 | European Pat. Off. |
| 0133011 | 7/1984 | European Pat. Off. |
| 0133012 | 2/1985 | European Pat. Off. |
| 0192435 | 8/1986 | European Pat. Off. |
| 0216483 | 4/1987 | European Pat. Off. |
| 0227092 | 7/1987 | European Pat. Off. |
| 0227094 | 7/1987 | European Pat. Off. |
| 0227095 | 7/1987 | European Pat. Off. |
| 0284560 | 3/1988 | European Pat. Off. |
| 1201925 | 8/1967 | United Kingdom |
| 2053950 | 2/1981 | United Kingdom |
| 1469691 | 8/1965 | WIPO |
| 1569678 | 4/1971 | WIPO |
| 2519592 | 11/1975 | WIPO |
| 3020473 | 12/1980 | WIPO |
| 3524519 | 1/1986 | WIPO |

*Primary Examiner*—Joseph Paul Brust
*Attorney, Agent, or Firm*—Oblon, Spivak, McClelland, Maier & Neustadt

[57] ABSTRACT

Methine transfer dyes have the formula

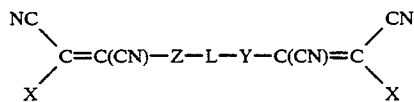

where
- L is a bridge member which does not permit any conjugation of π-electrons between Z and Y,
- X is cyano, $C_1$–$C_6$-alkoxycarbonyl or $C_1$–$C_6$-monoalkylcarbamoyl, wherein alkyl may in each case be interrupted by oxygen atoms, or is $C_5$–$C_7$-cycloalkoxycarbonyl, $C_5$–$C_7$-monocycloalkylcarbamoyl, phenoxycarbonyl or monophenylcarbamoyl, and
- Y and Z are each independently of the other aminophenylene, which may be benzo-fused, or heterocyclyl.

5 Claims, No Drawings

BICHROMOPHORIC CYANO-CONTAINING METHINE DYES AND TRANSFER THEREOF

This application is a continuation of application Ser. No. 07/851,779, filed on Mar. 6, 1992, now abandoned, which is a continuation of Ser. No. 07/650,220, filed on Feb. 4, 1991, now abandoned.

The present invention relates to novel methine dyes of the formula I

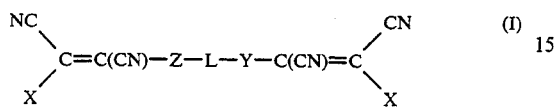

where

L is a bridge member which does not permit any conjugation of $\pi$-electrons between Z and Y, X is identical or different in its two appearances, denoting in each case cyano, $C_1$–$C_6$-alkoxycarbonyl or $C_1$–$C_6$-monoalkylcarbamoyl, wherein alkyl may in each case be interrupted by 1 or 2 oxygen atoms, or $C_5$–$C_7$-cycloalkoxycarbonyl, $C_5$–$C_7$-monocycloalkylcarbamoyl, phenoxycarbonyl or monophenylcarbamoyl, and and Y are identical or different and, together with the bridge member L, are each independently of the other a radical of the formula

(IIa)

(IIb)

(IIc)

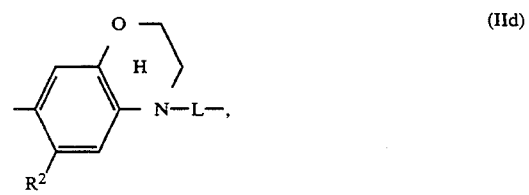

(IId)

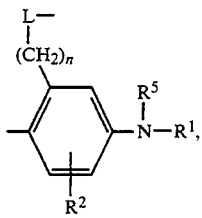

(IIe)

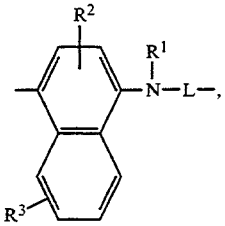

(IIf)

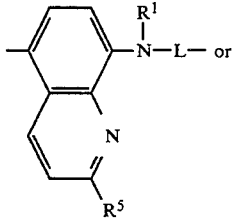

(IIg)

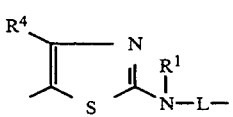

(IIh)

where n is 0 or 1, $R^1$ and $R^5$ are identical or different and each is independently of the other alkyl, alkoxyalkyl, alkoxycarbonylalkyl or alkanoyloxyalkyl, which may each have up to 10 carbon atoms and be hydroxyl- or cyano-substituted, hydrogen, benzyl, cyclohexyl, phenyl or tolyl, $R^2$ and $R^3$ are identical or different and each is independently of the other hydrogen, $C_1$–$C_8$-alkyl, $C_1$–$C_6$-alkoxy, $C_1$–$C_6$-alkanoylamino or $C_1$–$C_6$-alkylsulfonylamino, $R^4$ is hydrogen, halogen, $C_1$–$C_8$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl or $—NHR^1$, where $R^1$ is as defined above, and $R^6$ is hydrogen or $C_1$–$C_8$-alkyl.

Bichromophoric methine dyes with dicyanovinyl groups are known for example from GB-A-201 925, U.S. Pat. No. 3,553,245, DE-A-1 569 678, DE-A-2 519 592 and DE-A-3 020 473.

It is an object of the present invention to provide novel bichromophoric methine dyes which should have advantageous application properties.

We have found that this object is achieved by the methine dyes of the formula I defined at the beginning.

The bridge member L, which does not permit any conjugation of $\pi$-electrons between Z and Y, generally conforms to the formula $$—E^1—D—E^2—$$

where
D is a chemical bond, oxygen, —SO$_2$—, —O—CO—O—, 1,4-cyclohexylene, phenylene, —O—CO—(CH$_2$)$_P$—CO—O, —O—(CH$_2$)$_m$—O—,

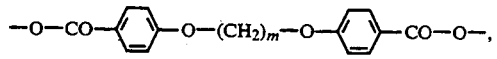

where P is from 1 to 10 and m is from 2 to 10,

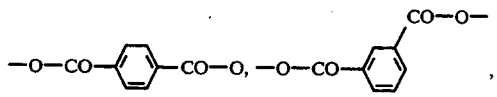

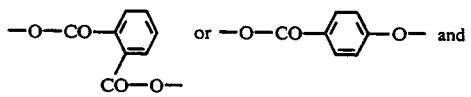 and

E$^1$ and E$^2$ are identical or different and each is independently of the other a chemical bond or C$_1$–C$_{15}$-alkylene.

Any alkyl or alkylene appearing in the above-mentioned formulae may be either straight-chain or branched.

A suitable R$^1$, R$^2$, R$^3$, R$^4$, R$^5$, or R$^6$ is for example methyl, ethyl, propyl, isopropyl, butyl, isobutyl, secbutyl, tert-butyl, pentyl, isopentyl, neopentyl, tertpentyl, hexyl, 2-methylpentyl, heptyl, octyl, 2-ethylhexyl or isooctyl.

R$^1$ and R$^5$ may each also be for example nonyl, isononyl, decyl, isodecyl, 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 4-methoxybutyl, 4-ethoxybutyl, 4-butoxybutyl, 2-cyanoethyl, 3-cyanopropyl, 4-cyanobutyl, 2-hydroxyethyl,

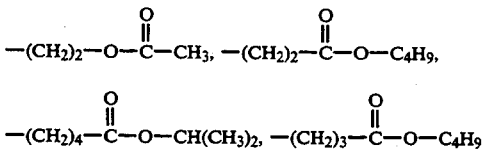

R$^4$ may also be for example phenyl, 2-, 3- or 4-methylphenyl, 2- or 4-isopropylphenyl, 2-butylphenyl, 2-, 3- or 4-methoxyphenyl, 2-propoxyphenyl, 4-butoxyphenyl, 2-(but-2-oxy)phenyl, benzyl, 2-, 3- or 4-methylbenzyl, 2-, 3- or 4-methoxybenzyl, fluorine, chlorine, bromine, 2-thienyl or 3-thienyl.

R$^2$ and R$^3$ may each also be methoxy, ethoxy, propoxy, isopropoxy, butoxy, isobutoxy, sec-butoxy, pentyloxy, isopentyloxy, neopentyloxy, hexyloxy, formylamino, acetylamino, propionylamino, butyrylamino, methylsulfonylamino, ethylsulfonylamino, propylsulfonylamino, isopropylsulfonylamino or butylsulfonylamino.

X is for example methoxycarbonyl, ethoxycarbonyl, propoxycarbonyl, isopropoxycarbonyl, butoxycarbonyl, 2-methoxyethoxycarbonyl, methylcarbamoyl, ethylcarbamoyl, 2-methoxyethylcarbamoyl, cyclopentyloxycarbonyl, cyclohexyloxycarbonyl, cycloheptyloxycarbonyl, cyclopentylcarbamoyl, cyclohexylcarbamoyl or cycloheptylcarbamoyl.

E$^1$ and E$^2$ are each for example methylene, 1,2-ethylene, ethylidene, 1,2- or 1,3-propylene or 1,4-, 1,3-1,3-or 2,3-butylene.

D is for example

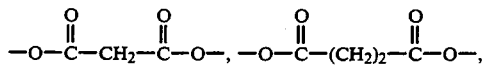

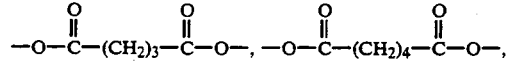

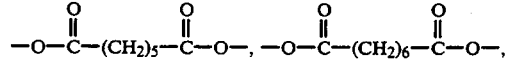

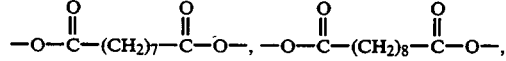

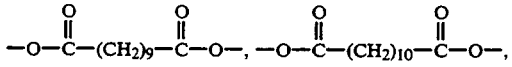

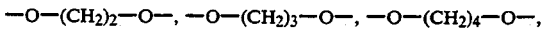

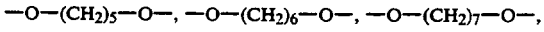

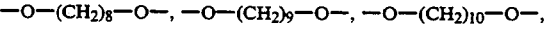

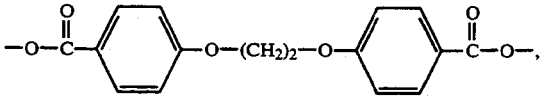

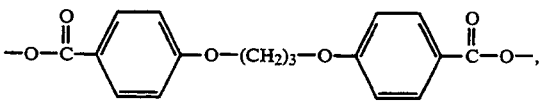

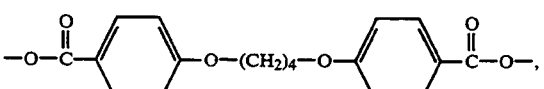

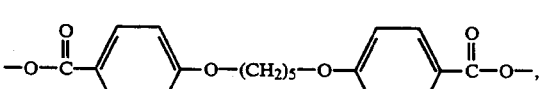

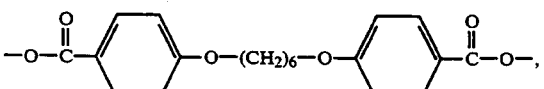

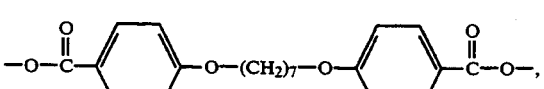

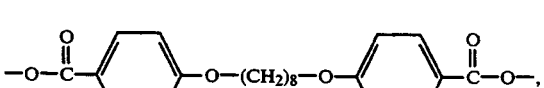

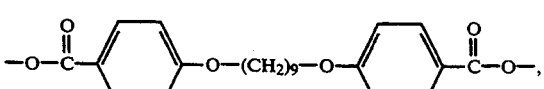

or

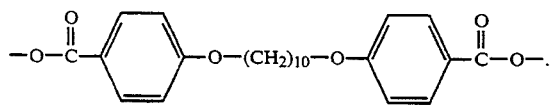

Preference is given to methine dyes of the formula I in which Z and Y each conform to the formula IIa, IIb, IIc, IId, IIe, IIf or IIg.

Preference is further given to methine dyes of the formula I in which $R^1$ and $R^5$ are each independently of the other hydrogen, unsubstituted or cyano- or acetyl-substituted $C_1$-$C_6$-alkyl or cyclohexyl, $R^2$ and $R^3$ are each independently of the other hydrogen, methyl, methoxy or acetylamino, $R^4$ is hydrogen, $C_1$-$C_6$-alkyl or unsubstituted or methyl- or methoxy-substituted phenyl, 2-thienyl or 3-thienyl, and $R^6$ is hydrogen or $C_1$-$C_6$-alkyl.

Particular preference is given to methine dyes of the formula I in which the bridge member L has the formula

—E$^1$—D—E$^2$— where $E^1$ and $E^2$ are each independently of the other $C_1$-$C_4$-alkylene and D is a chemical bond, oxygen, —SO$_2$—, —O—CO—(CH$_2$)$_P$—CO—O,

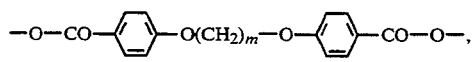

where P is from 2 to 4 and m is from 6 to 10,

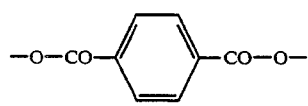

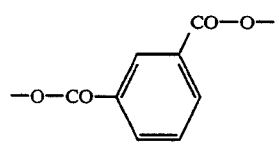

or

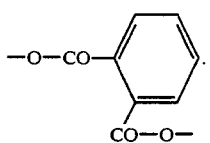

Particular preference is further given to methine dyes of the formula I in which X is cyano.

The methine dyes I according to the present invention can be obtained in a conventional manner, for example as described in GB 1,201,925, U.S. Pat. No. 3,553,245, DE-A-1,569,678, DE-A-2,519,592, DE-A-3,020,473, U.S. Pat. No. 2,889,335 and EP-A-284,560.

A preferred procedure comprises for example first linking the donor groups Z and Y together by means of an appropriate bridge member and then preparing from the resulting intermediates the methine dyes I by incorporation of cyanovinyl groups.

By way of illustration see the following synthesis schemes for preparing methine dyes I (where Z and Y are in each case as defined above):

a) synthesis of dye intermediates

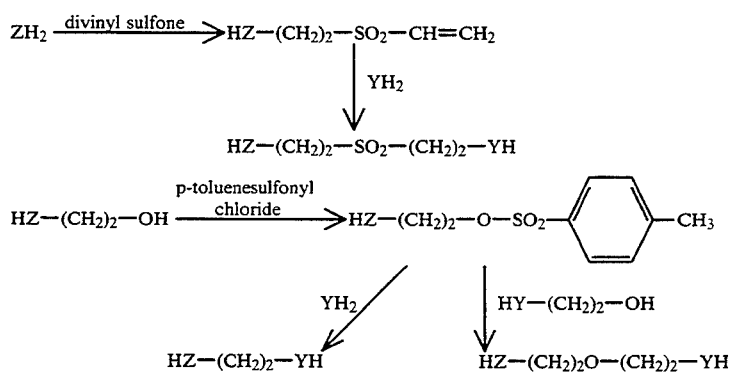

b) incorporation of cyanovinyl group

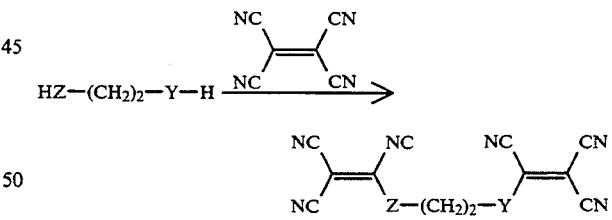

Other dye intermediates can be converted in the same way.

The novel dyes I are highly soluble in organic solvents.

It is a further object of the present invention to provide a novel process for the thermal transfer of dyes.

In the thermotransfer printing process, a transfer sheet which contains a thermally transferable dye in one or more binders on a support with or without suitable assistants is heated from the back with an energy source, for example a thermal printing head, in short pulses (lasting fractions of a second), causing the dye to migrate out of the transfer sheet and to diffuse into the surface coating of a receiving medium. The essential advantage of this process is that the amount of dye to be transferred (and hence the color gradation) is readily controllable through adjustment of the energy supplied by the energy source.

In general, color recording is carried out using the three subtractive primaries yellow, magenta and cyan (with or without black). To ensure optimal color recording, the dyes must have the following properties:

ready thermal transferability, little tendency to migrate within or out of the surface coating of the receiving medium at room temperature, high thermal and photochemical stability and resistance to moisture and chemical substances, suitable hues for subtractive color mixing, a high molar absorption coefficient, no tendency to crystallize out on storage of the transfer sheet.

From experience these requirements are very difficult to meet at one and the same time.

For this reason, most of the existing thermal transfer printing dyes do not meet the required property profile.

We have found that the further object is achieved by a process for transferring a bichromophoric methine dye from a transfer to a sheet of plastic-coated paper with the aid of an energy source, which comprises using a transfer on which there is or are one or more dyes of the formula I

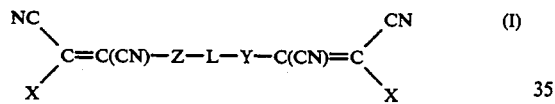

where

L is a bridge member which does not permit any conjugation of $\pi$-electrons between Z and Y, X is identical or different in its two appearances, denoting in each case cyano, $C_1$-$C_6$-alkoxycarbonyl or $C_1$-$C_6$-monoalkylcarbamoyl, wherein alkyl may in each case be interrupted by 1 or 2 oxygen atoms, or $C_5$-$C_7$-cycloalkoxycarbonyl, $C_5$-$C_7$-monocycloalkylcarbamoyl, phenoxycarbonyl or monophenylcarbamoyl, and Z and Y are identical or different and, together with the bridge member L, are each independently of the other a radical of the formula

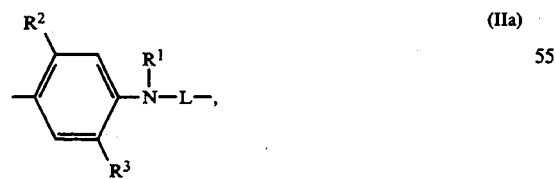

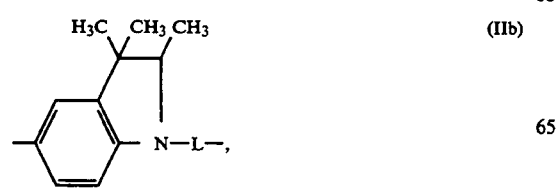

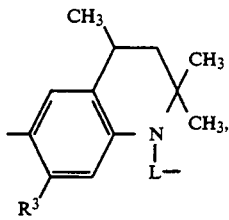

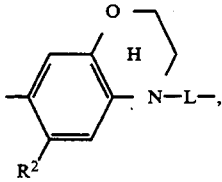

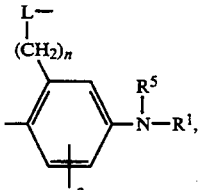

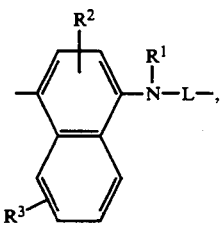

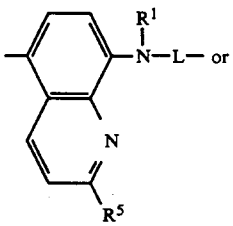

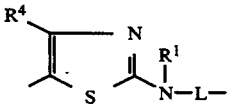

where n is 0 or 1, $R^1$ and $R^5$ are identical or different and each is independently of the other alkyl, alkoxyalkyl, alkoxycarbonylalkyl or alkanoyloxyalkyl, which may each have up to 10 carbon atoms and be hydroxyl- or cyano-substituted, hydrogen, benzyl, cyclohexyl, phenyl or tolyl, $R^2$ and $R^3$ are identical or different and each is independently of the other $C_1$-$C_8$-alkyl, $C_1$-$C_6$-alkoxy, $C_1$-$C_6$-alkanoylamino or $C_1$-$C_6$-alkylsulfonylamino, $R^4$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, thienyl or —NHR¹, where R¹ is as defined above, and R⁶ is hydrogen or $C_1$-$C_8$-alkyl.

Compared with the dyes used in existing processes, the dyes transferred in the process according to the invention are notable in general for improved fixation in the receiving medium at room temperature, readier thermal transferability, higher lightfastness, higher stability to moisture and chemical substances, better solubility in organic solvents, higher inked ribbon stability and higher purity of hue.

It is also surprising that the dyes of the formula I are readily transferable and that they have a high inked ribbon stability, despite their high molecular weight.

The existing thermotransfer printing systems use mixtures of monochromophoric dyes to absorb about one third of the incident white light each in the cyan and in particular in the magenta region. This presents the problem that the dyes used must have exactly the same transfer characteristics to ensure that the same amount of dye is transferred to the acceptor for a given power output of the thermal printing head. The process according to the present invention does not suffer from these disadvantages. The result is, for example in the case of trichromic systems, an improved black print.

Owing to their high molar extinction coefficients and their high brilliance, the dyes of the formula I employed in the novel process are advantageously suitable for preparing a trichromatic system as required for subtractive color mixing.

In addition, the ready transferability permits wide variation of the receiver or acceptor plastics, and thus makes possible very efficient adaptation of the dyes within the overall system of donor/receiver.

To prepare the dye transfers required in the process according to the present invention, the dyes are incorporated into a suitable organic solvent or solvent mixture together with one or more binders and possibly further assistants to form a printing ink in which the dye is preferably present in a molecularly dispersed, dissolved, form. The printing ink is then applied to an inert support by knife coating and dried in air.

Suitable organic solvents for the dyes I are for example those in which the solubility of the dyes I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and are capable of binding the dye to the inert support in a form in which it will not rub off. Preference is given in particular to those binders which, after the printing ink has dried in air, hold the dye in a clear, transparent film in which no visible crystallization of the dye occurs.

Examples of such binders are cellulose derivatives, e.g. methylcellulose, ethylcellulose, ethylhydroxyethylcellulose, hydroxypropylcellulose, cellulose acetate and cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, polymethyl methacrylate or styrene/acrylate copolypolyester resins, polyamide resins, polyurethane resins or natural CH resins, such as gum arabic. Other suitable binders are described for example in DE-A-3,524,519.

Preferred binders are ethylcellulose, ethylhydroxyethylcellulose, polyvinyl butyrate and polyvinyl acetate.

The weight ratio of binder:dye is in general within the range from 1:1 to 10:1.

Suitable assistants are for example release agents as mentioned in EP-A-227,092, EP-A-192,435 and the patent applications cited therein. It is also possible to include in particular organic additives which prevent the transfer dyes from crystallizing out in the course of storage or heating of the inked ribbon, for example cholesterol or vanillin.

Inert support materials are for example tissue, blotting or parchment paper and plastics films possessing good heat resistance, for example metallized or unmetallized polyester, polyamide or polyimide. The inert support may additionally be coated on the side facing the thermal printing head with a lubricant or slipping layer in order that adhesion of the thermal printing head to the support material may be prevented. Suitable lubricants are described for example in EP-A-216,483 and EP-A-227,095. The thickness of the support is in general from 3 to 30 μm, preferably from 5 to 10 μm.

The dye-receiving medium can be basically any heat resistant plastics layer having affinity for dyes to be transferred, for example a modified polycarbonate or polyester. Suitable recipes for the receiving layer composition are described in detail for example in EP-A-227,094, EP-A-133,012, EP-A-133,011, EP-A-111,004, JP-A-199,997/1986, JP-A-283,595/1986, JP-A-237,694/1986 and JP-A-127,392/1986.

Transfer is effected by means of an energy source, for example a laser or a thermal printing head, which must be heatable to $\geq 300°$ C. in order that dye transfer may take place within the time range t: $0 < t < 15$ msec. In the course of the transfer, the dye migrates out of the transfer sheet and diffuses into the surface coating of the receiving medium.

The dyes according to the present invention are also advantageous for coloring synthetic materials, for example polyesters, polyamides or polycarbonates.

The Examples which follow further illustrate the present invention. Percentages are by weight, unless otherwise stated.

PREPARATION OF METHINE DYES

Example A

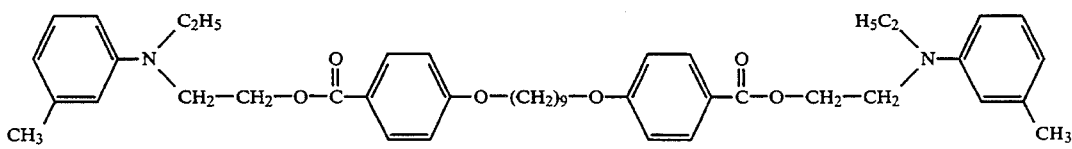

50 g of 1,9-dibromononane, 58.1 g of ethyl 4-hydroxybenzoate and 94.2 g of potassium carbonate were suspended at room temperature in 500 ml of N,N-dimethylformamide (anhydrous), and the suspension was then heated at 100° C. until starting material was no longer detectable by thin layer chromatography. After cooling, the reaction mixture was filtered with suction, and the solvent was removed under reduced pressure. The residue was recrystallized from methanol (37.4 g of pure substance), admixed with 300 ml of ethanol and added to a mixture of 19.9 g of potassium hydroxide in 260 ml of ethanol, and the resulting mixture was raised to the reflux point. After complete hydrolysis (check by TLC), the mixture was cooled to room temperature and filtered with suction, and the residue was suspended in water, acidified with hydrochloric acid, filtered off again with suction and washed neutral. This gave 28.3 g of pure substance. $^1$H-NMR (CDCl$_3$, TMS): $\delta = 1.10$–1.90 (m, 14H, CH$_2$), 4.05 (t, 4H, OCH$_2$), 7.00 (d, 4H, aromat-H), 7.90 (d, 4H, aromat-H), 12.15 (s, 2H, COOH) ppm.

28 g of the product obtained were suspended in 120 ml of thionyl chloride, and the suspension was refluxed until solution was complete. After the reaction had ended, the solution was cooled down to room temperature, and the product was precipitated with petroleum ether, filtered off with suction, washed with petroleum ether (IR: COCl, 1760–1740 cm$^{-1}$) and then dissolved in 50 ml of methylene chloride. This solution was added dropwise to 22.9 g of N-(2-hydroxyethyl)-N-ethyl-3-methylaniline, a spatula tip of 4-dimethylaminopyridine and 6.5 g of triethylamine in 50 ml of anhydrous methylene chloride at 0°–5° C. Stirring was then continued at room temperature until the reaction had ended. The reaction mixture was stirred into ice-water, acidified with dilute hydrochloric acid and extracted with methylene chloride. The organic phase was washed neutral with water and dried, and the solvent was removed under reduced pressure (yield: 42 g, R$_f$ value: 0.32 5:1 v/v toluene/ethyl acetate - TLC aluminum sheets, silica gel 60 F$_{254}$ from E. Merck).

Example B

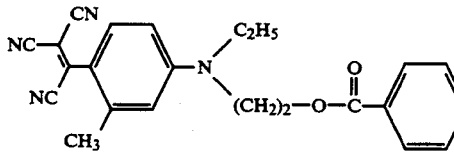

7.2 g of the compound of Example A were dissolved in 20 ml of anhydrous N,N-dimethylformamide, and 2.6 g of tetracyanoethylene were added a little at a time with stirring in the course of 10 minutes. On completion of the addition, the mixture was heated at 55°–60° C. for 15 minutes, then cooled to room temperature and stirred into 100 ml of ice-water. The oily dye precipitate was separated off, washed with water, 20% strength by weight sodium sulfite solution and once more with water, sucked dry and taken up in 250 ml of acetone. After filtration, the solvent was removed under reduced pressure, and the target product was purified by chromatography (silica gel/toluene/ethyl acetate).

Yield: 7.8 g
$\lambda_{max}$ (CH$_2$Cl$_2$): 539 nm
R$_f$ value (5:1 v/v toluene/ethyl acetate): 0.26
IR (film): $\delta = 3050, 3000, 2960, 2240, 1700$ cm$^{-1}$.

The same method was used to obtain the following compounds C and D:

Example C

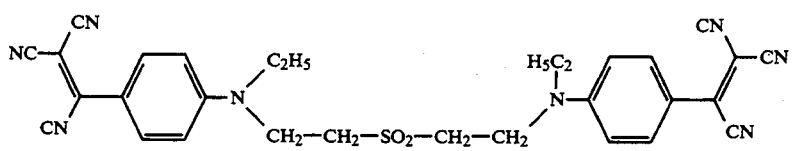

$\lambda_{max}$ (CH$_2$Cl$_2$): 502 nm
R$_f$ value (ethyl acetate): 0.52

Example D

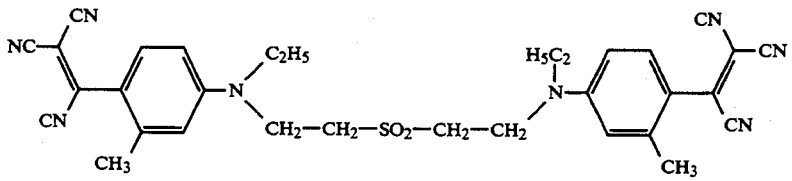

$\lambda_{max}$ (CH$_2$Cl$_2$): 526 nm
R$_f$ value (5:1 v/v toluene/ethyl acetate): 0.22

TRANSFER OF METHINE DYES

For a simple quantitative examination of the transfer characteristics of the dyes, the thermal transfer was effected with large hotplates instead of a thermal printing head, the transfer temperature being varied within the range 70° C.$<$T$<$120° C. while the transfer time was fixed at 2 minutes.

$\alpha$) General recipe for coating the support with dye:

1 g of binder was dissolved in 8 ml of 8:2 v/v toluene/ethanol at 40°–50° C. A solution of 0.25 g of dye in 5 ml of tetrahydrofuran was added, and any insolubles were filtered off. The print paste thus obtained was applied with an 80 $\mu$m doctor blade to a polyester sheet (thickness: 6–10 $\mu$m) and dried with a hairdryer.

$\beta$) Testing of thermal transferability

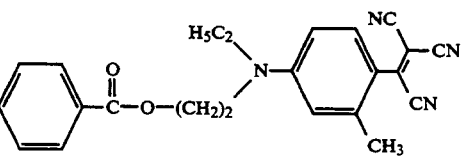

The dyes used were tested as follows:

The polyester sheet donor containing the dye under test in the coated front was placed face down on commercial receiver paper (specified hereinafter) and pressed down. Donor/receiver were then wrapped in aluminun foil and heated between two hotplates at various temperatures T (within the temperature range 70° C.<T<120° C.). The amount of dye diffusing into the bright plastics coating of the receiver is proportional to the optical density (=absorbance A). The latter was determined photometrically. A plot of the logarithm of the absorbance A of the colored receiver papers measured within the temperature range from 80° to 110° C. against the reciprocal of the corresponding absolute temperature is a straight line from whose slope it is possible to calculate to the activation energy $\Delta E_T$ for the transfer experiment:

$$\Delta E_T = 2.3 \times R \times \frac{\Delta \log A}{\Delta \left[\frac{1}{T}\right]}$$

To complete the characterization, it is additionally possible to read from the plots the temperature T* [°C.] at which the absorbance A of the colored receiver papers attains the value 1.

The dyes listed in the Tables below were processed according to α), and the dye-coated transfers obtained were tested for their transfer characteristics according to β). The Tables show in each case the thermal transfer parameters T* and $\Delta E_T$, the absorption maxima of the dyes $\lambda_{max}$ (measured in methylene chloride), the binders used and the weight ratio of dye:binder:assistant.

The key to the abbreviations is as follows:
D=dye
=binder
EC=ethylcellulose
HCVPP=Hitachi Color Video Print Paper (receiver)
VY-C=Hitachi Color Video Print Paper (receiver)
PBTP=polybutylene terephthalate film (receiver)
SV 100=Color Video Print Paper/Kodak AG (receiver)

TABLE I

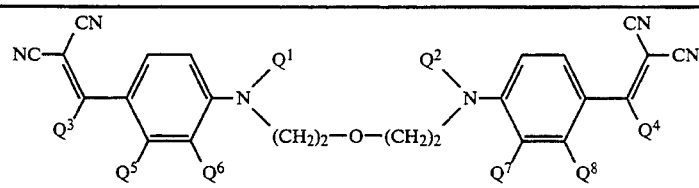

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 1 | $C_2H_5$ | $C_2H_5$ | CN | CN | H | H | H | H | 524 | EC | 1:4 | HCVPP | 60 | 66 |
| 2 | $C_2H_5$ | $C_2H_5$ | CN | CN | H | H | H | H | 524 | EC | 1:4 | PBTP | 79 | 105 |
| 3 | H | $C_2H_5$ | CN | CN | H | H | H | H | 523 | EC | 1:4 | HCVPP | 38 | 43 |
| 4 | H | $C_2H_5$ | CN | CN | H | H | H | H | 523 | EC | 1:4 | PBTP | 78 | 65 |
| 5 | $C_2H_5$ | $C_2H_5$ | CN | CN | $CH_3$ | H | H | $CH_3$ | 555 | EC | 1:4 | SV 100 | 83 | 92 |
| 6 | $C_2H_5$ | $C_2H_5$ | CN | CN | $CH_3$ | H | H | $CH_3$ | 555 | EC | 1:4 | PBTP | 114 | 58 |
| 7 | $C_2H_5$ | $C_2H_5$ | CN | CN | H | H | H | H | 524 | EC | 1:2 | VY-C | 108 | 85 |

TABLE 2

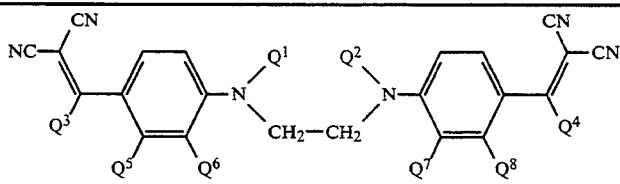

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 8 | $C_2H_5$ | $C_2H_5$ | CN | CN | H | H | H | H | 523 | EC | 1:4 | HCVPP | 56 | 55 |
| 9 | $C_2H_5$ | $C_2H_5$ | CN | CN | H | H | H | H | 523 | EC | 1:4 | PBTP | 83 | 64 |
| 10 | $C_2H_5$ | cyclohexyl | CN | CN | H | H | $OCH_3$ | H | 531 | EC | 1:4 | HCVPP | 78 | 84 |
| 11 | $C_2H_5$ | cyclohexyl | CN | CN | H | H | $OCH_3$ | H | 531 | EC | 1:4 | SV 100 | 85 | 225 |
| 12 | $C_2H_5$ | cyclohexyl | CN | CN | H | H | $OCH_3$ | H | 531 | EC | 1:4 | PBTP | 104 | 85 |
| 13 | $C_2H_5$ | $C_2H_5$ | CN | CN | (ring) | (ring) | H | H | 528 | EC | 1:4 | HCVPP | 84 | 75 |

TABLE 2-continued

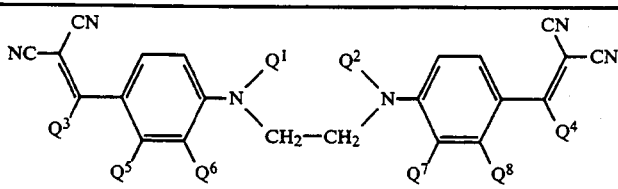

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 14 | $C_2H_5$ | $C_2H_5$ | CN | CN | | | H | H | 528 | EC | 1:4 | PBTP | 127 | 40 |

TABLE 3

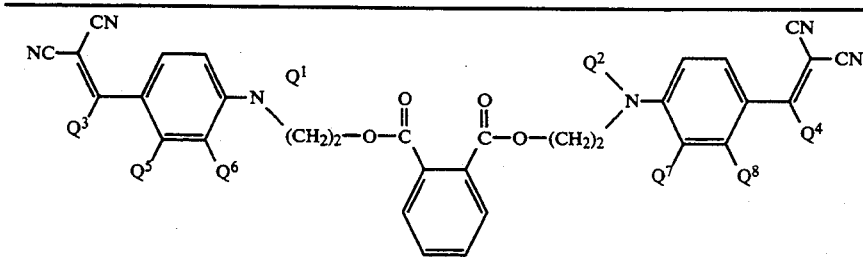

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 15 | $C_2H_5$ | $C_2H_5$ | CN | CN | H | H | H | H | 514 | EC | 1:4 | HCVPP | 85 | 22 |
| 16 | $C_2H_5$ | $C_2H_5$ | CN | CN | H | H | H | H | 514 | EC | 1:4 | PBTP | 132 | 31 |
| 17 | $C_2H_5$ | $C_2H_5$ | CN | CN | H | H | H | H | 514 | EC | 1:4 | SV 100 | 87 | 67 |
| 18 | $C_2H_5$ | $C_2H_5$ | CN | CN | $CH_3$ | H | H | $CH_3$ | 536 | EC | 1:4 | HCVPP | 95 | 47 |
| 19 | $C_2H_5$ | $C_2H_5$ | CN | CN | $CH_3$ | H | H | $CH_3$ | 536 | EC | 1:4 | PBTP | 170 | 26 |
| 20 | $C_2H_5$ | $C_2H_5$ | CN | CN | $CH_3$ | H | H | $CH_3$ | 536 | EC | 1:2 | SV 100 | 89 | 151 |
| 21 | $C_2H_5$ | $C_2H_5$ | CN | CN | $CH_3$ | H | H | $CH_3$ | 536 | PVB | 1:2 | PBTP | 126 | 77 |

TABLE 4

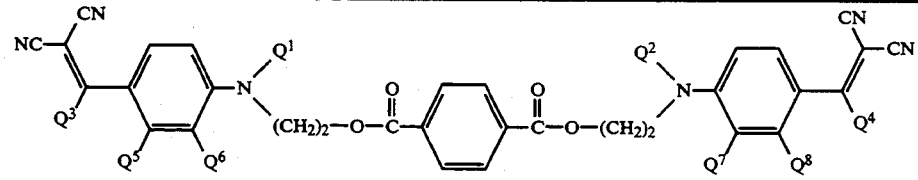

| Ex. No. | $Q^1$ | $Q^2$ | $Q^3$ | $Q^4$ | $q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 22 | $C_2H_5$ | $C_2H_5$ | CN | CN | H | H | H | H | 513 | EC | 1:4 | HCVPP | 79 | 83 |
| 23 | $C_2H_5$ | $C_2H_5$ | CN | CN | H | H | H | H | 513 | EC | 1:4 | PBTP | 137 | 37 |
| 24 | $C_2H_5$ | $C_2H_5$ | CN | CN | H | H | H | H | 513 | EC | 1:4 | SV 100 | 88 | 66 |
| 25 | $C_2H_5$ | $C_2H_5$ | CN | CN | $CH_3$ | H | H | $CH_3$ | 535 | EC | 1:4 | SV 100 | 101 | 83 |
| 26 | $C_2H_5$ | $C_2H_5$ | CN | CN | $CH_3$ | H | H | $CH_3$ | 535 | EC | 1:4 | PBTP | 135 | 60 |

TABLE 5

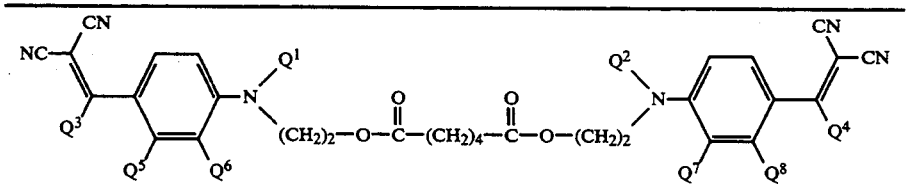

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 27 | $C_2H_5$ | $C_2H_5$ | CN | CN | H | H | H | H | 515 | EC | 1:4 | HCVPP | 73 | 32 |
| 28 | $C_2H_5$ | $C_2H_5$ | CN | CN | H | H | H | H | 515 | EC | 1:4 | PBTP | 117 | 49 |
| 29 | $C_2H_5$ | $C_2H_5$ | CN | CN | H | H | H | H | 515 | EC | 1:4 | SV 100 | 83 | 90 |
| 30 | $C_2H_5$ | $C_2H_5$ | CN | CN | $CH_3$ | H | H | $CH_3$ | 538 | EC | 1:4 | SV 100 | 88 | 106 |

TABLE 6

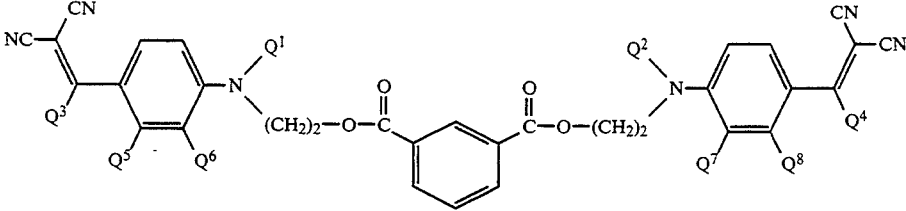

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 31 | $C_2H_5$ | $C_2H_5$ | CN | CN | H | H | H | H | 513 | EC | 1:4 | HCVPP | 83 | 69 |
| 32 | $C_2H_5$ | $C_2H_5$ | CN | CN | H | H | H | H | 513 | EC | 1:4 | PBTP | 142 | 25 |
| 33 | $C_2H_5$ | $C_2H_5$ | CN | CN | H | H | H | H | 513 | EC | 1:4 | SV 100 | 90 | 71 |
| 34 | $C_2H_5$ | $C_2H_5$ | CN | CN | $CH_3$ | H | H | $CH_3$ | 536 | EC | 1:4 | SV 100 | 98 | 108 |

TABLE 7

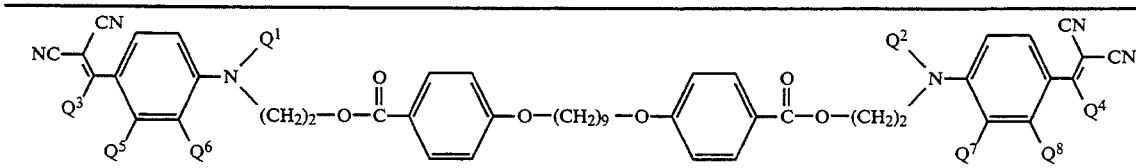

| Ex. No. | $Q^1$ | $Q^2$ | $Q^3$ | $Q^4$ | $Q^5$ | $Q^6$ | $Q^7$ | $Q^8$ | $\lambda_{max}$ [nm] | D | F:D | Receiver | T* [°C.] | $\Delta E_T$ [kJ/mol] |
|---|---|---|---|---|---|---|---|---|---|---|---|---|---|---|
| 35 | $C_2H_5$ | $C_2H_5$ | CN | CN | $CH_3$ | H | H | $CH_3$ | 539 | EC | 1:4 | PBTP | 158 | 71 |
| 36 | $C_2H_5$ | $C_2H_5$ | CN | CN | $CH_3$ | H | H | $CH_3$ | 539 | EC | 1:4 | HCVPP | 119 | 38 |
| 37 | $C_2H_5$ | $C_2H_5$ | CN | CN | H | H | H | H | 517 | EC | 1:4 | SV 100 | 103 | 133 |

TABLE 8 / TABLE 9

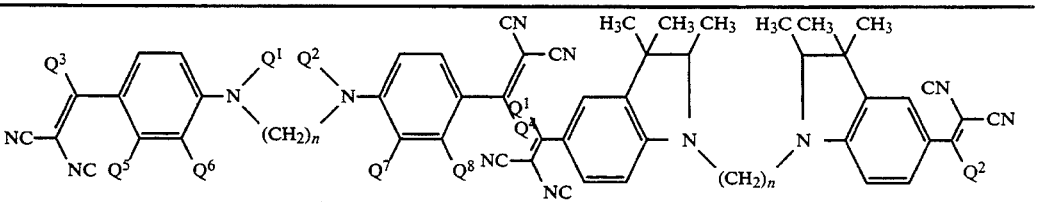

| Ex. No. | $Q^1$ | $Q^2$ | $Q^3$ | $Q^4$ | $Q^5$ | $Q^6$ | $Q^7$ | $Q^8$ | n | $\lambda_{max}$ [nm] | D | F:D | Receiver | T* [°C.] | $\Delta E_T$ [kJ/mol] |
|---|---|---|---|---|---|---|---|---|---|---|---|---|---|---|---|
| 38 | $C_4H_9$ | $C_4H_9$ | CN | CN | H | H | H | H | 4 | 527 | EC | 1:4 | HCVPP | <70 | 26 |
| 39 | $C_4H_9$ | $C_4H_9$ | CN | CN | H | H | H | H | 6 | 529 | — | — | — | — | — |
| 40 | | | CN | CN | | | | | 6 | 544 | — | — | — | — | — |

TABLE 10
| Ex. No. | Formula | $\lambda_{max}$ [nm] | D | F:D | Receiver | T* [°C] | $\Delta E_T$ [kJ/mol] |
|---|---|---|---|---|---|---|---|
| 41 | 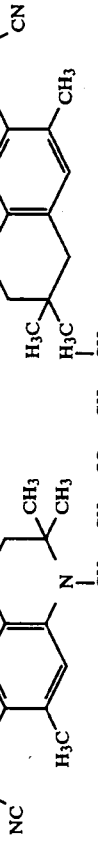 | 542 | EC | 1:2 | HCVPP | 112 | 62 |
| 42 | 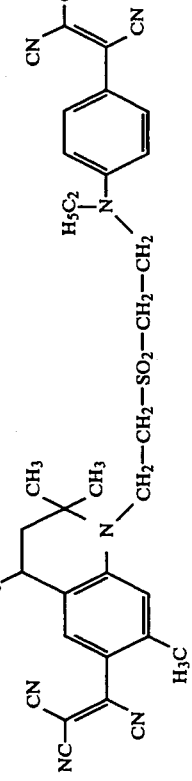 | 530 | EC | 1:2 | HCVPP | 92 | 19 |
| 43 | 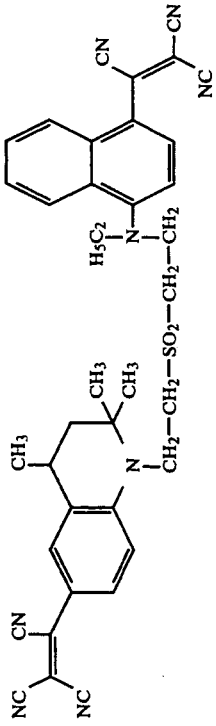 | 549 | EC | 1:2 | HCVPP | 97 | 45 |

The same method can be used to transfer the following methine dyes:
| Example No. | |
|---|---|
| 44 | 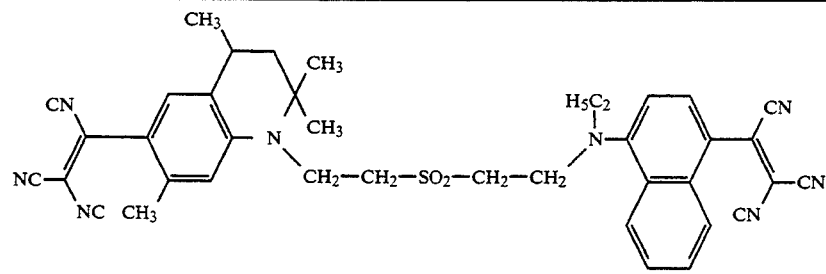 |
| 45 | 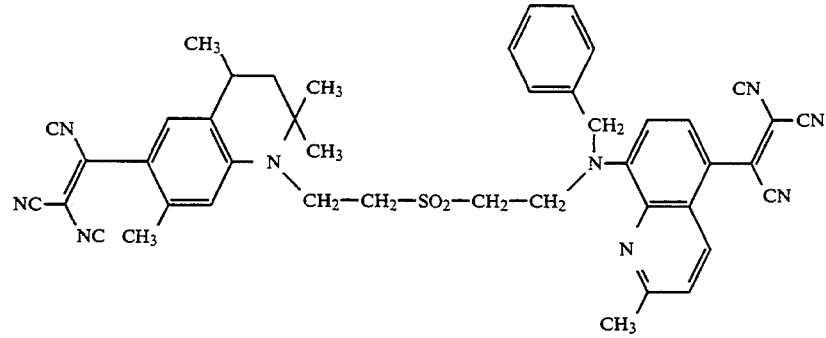 |
| 46 | 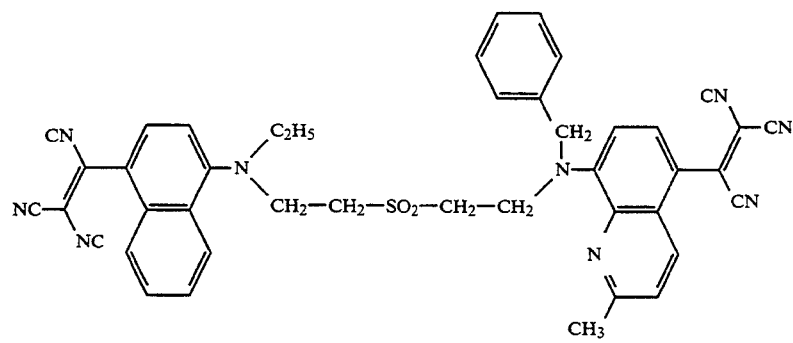 |
| 47 | 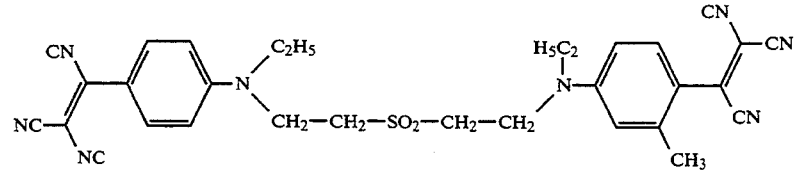 |
| 48 | 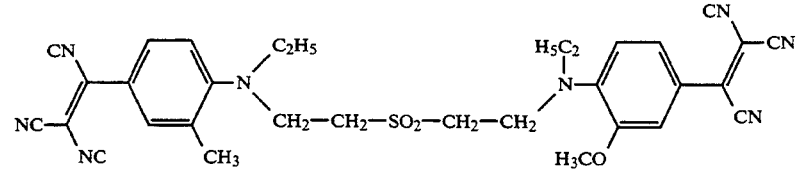 |
| 49 | 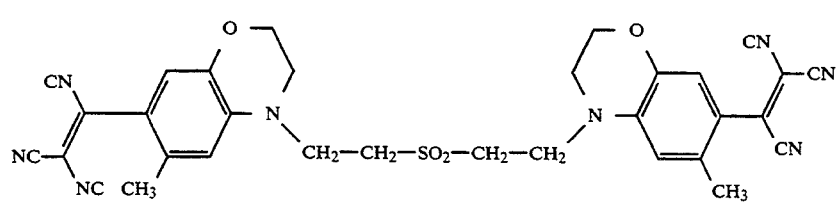 |

-continued
Example No.
50
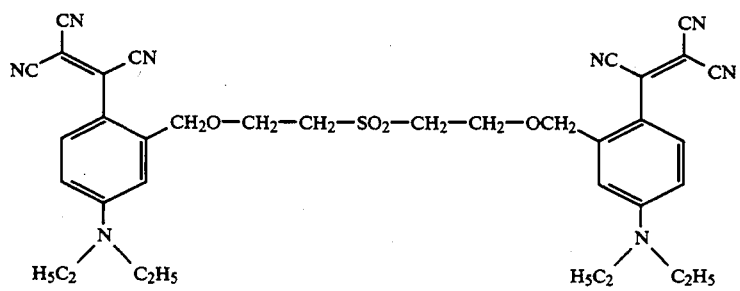
51
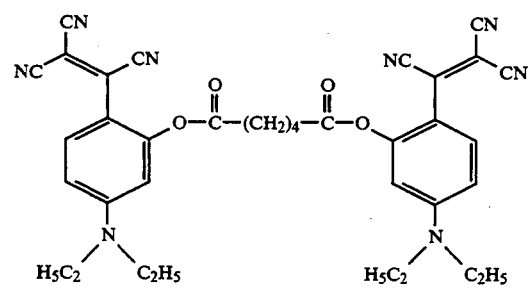
52
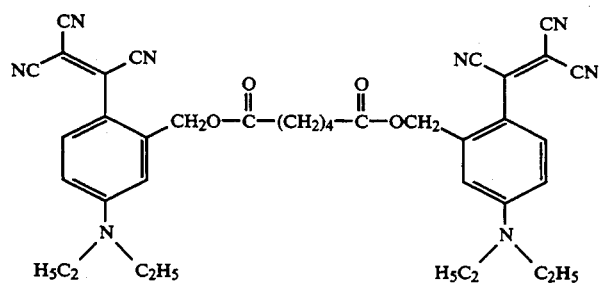
53
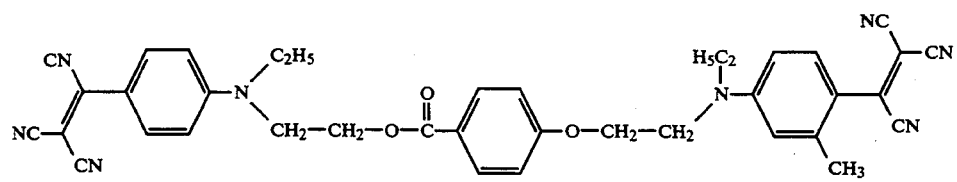
54
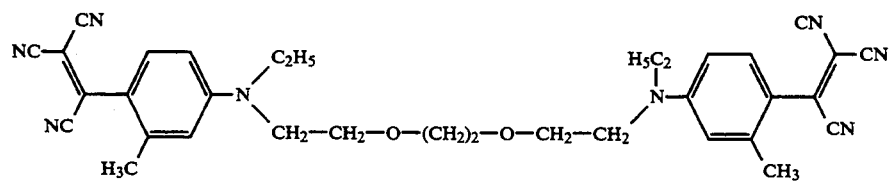
55
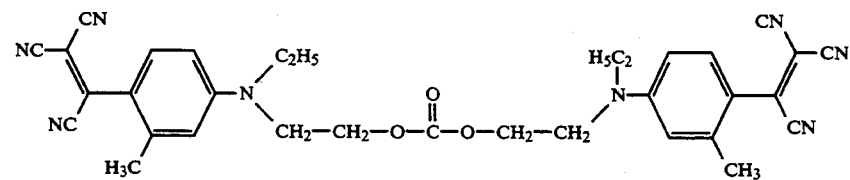

-continued
| Example No. | |
|---|---|
| 56 | 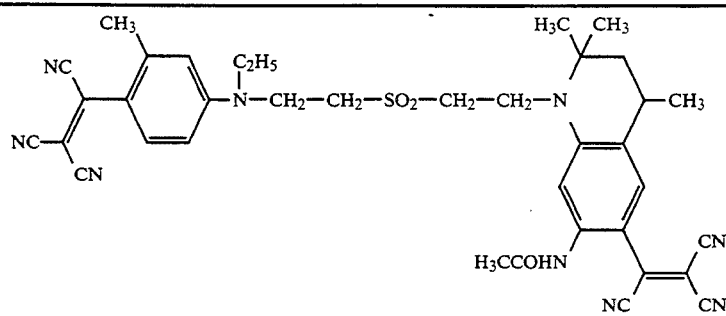 |
| 57 | 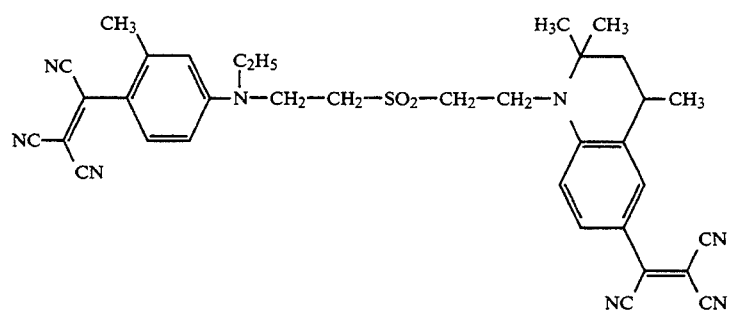 |
| 58 | 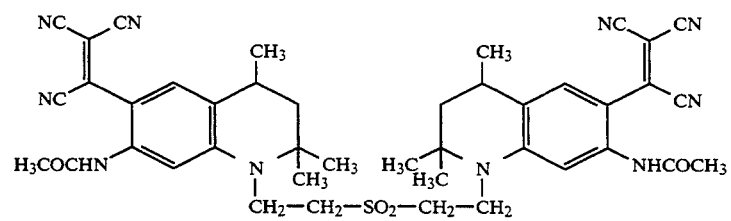 |
| 59 | 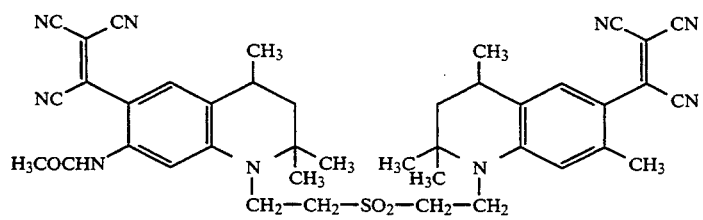 |
| 60 | 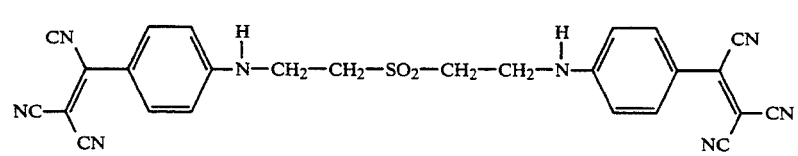 |
| 61 | 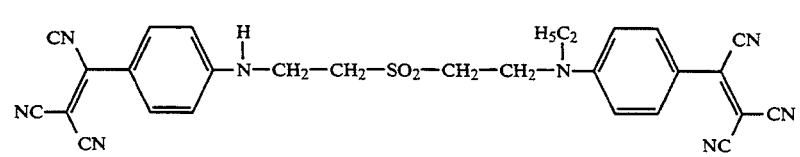 |
| 62 | 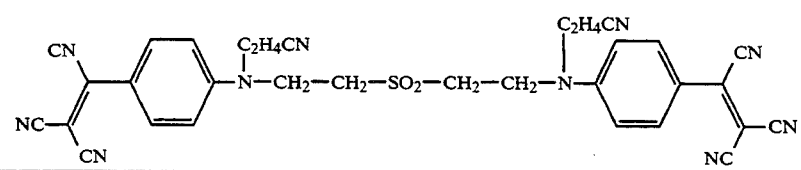 |
We claim:
1. A methine dye of the formula I

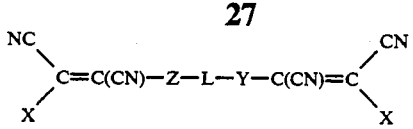 (I)

where
L is a bridge member which does not permit any conjugation of π-electrons between Z and Y of the formula $$-E^1-D-E^2-$$

wherein
D is a chemical bond, oxygen, —SO$_2$—, —O—CO—O—, 1,4-cyclohexylene, phenylene, —O—CO—(CH$_2$)$_p$—CO—O, —O—(CH$_2$)$_m$—O—,

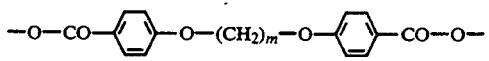

where p is from 1 to 10 and m is from 2 to 10,

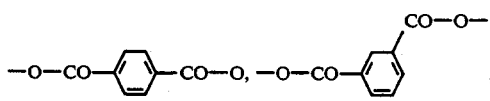

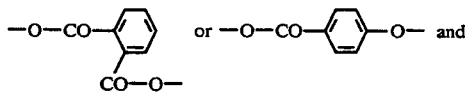

E$^1$ and E$^2$ are identical or different and each is independently of the other a chemical bond or C$_1$-C$_{15}$-alkylene,
X is identical or different in its two appearances, denoting in each case cyano, C$_1$-C$_6$-alkoxycarbonyl or C$_1$-C$_6$-monoalkylcarbamoyl, wherein alkyl may in each case be interrupted by 1 or 2 oxygen atoms, or C$_5$-C$_7$-cycloalkoxycarbonyl, C$_5$-C$_7$-monocycloalkylcarbamoyl, phenoxycarbonyl or monophenylcarbamoyl, and
Z and Y are identical or different and, together with the bridge member L, are each independently of the other a radical of the formula

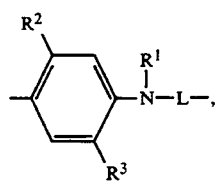 (IIa)

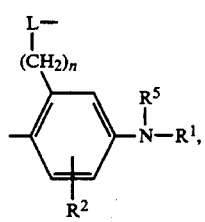 (IIe)

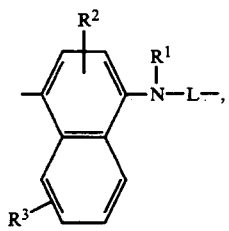 (IIf)

where
n is 0 or 1,
R$^1$ and R$^5$ are identical or different and each is independently of the other alkyl, alkoxyalkyl, alkoxycarbonylalkyl or alkanoyloxyalkyl, which may each have up to 10 carbon atoms and be hydroxyl- or cyano-substituted, hydrogen, benzyl, cyclohexyl, phenyl or tolyl,
R$^2$ and R$^3$ are identical or different and each is independently of the other hydrogen, C$_1$-C$_8$-alkyl, C$_1$-C$_6$ alkoxy, C$_{1-6}$ alkanoylamino or C$_1$-C$_6$-alkylsulfonylamino.

2. The methine dye of claim 1, wherein D is —SO$_2$—.
3. The methine dye of claim 1, wherein Z and Y are each a radical of the formula.

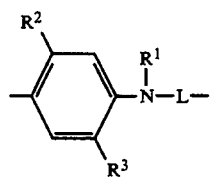 (IIa)

4. The methine dye of claim 1, wherein X is cyano.
5. A methine dye of the formula

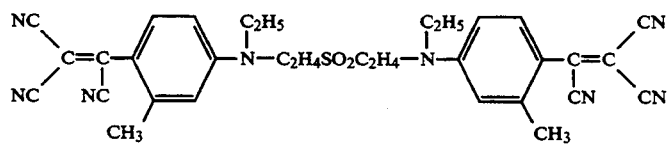

* * * * *